Figure 1:
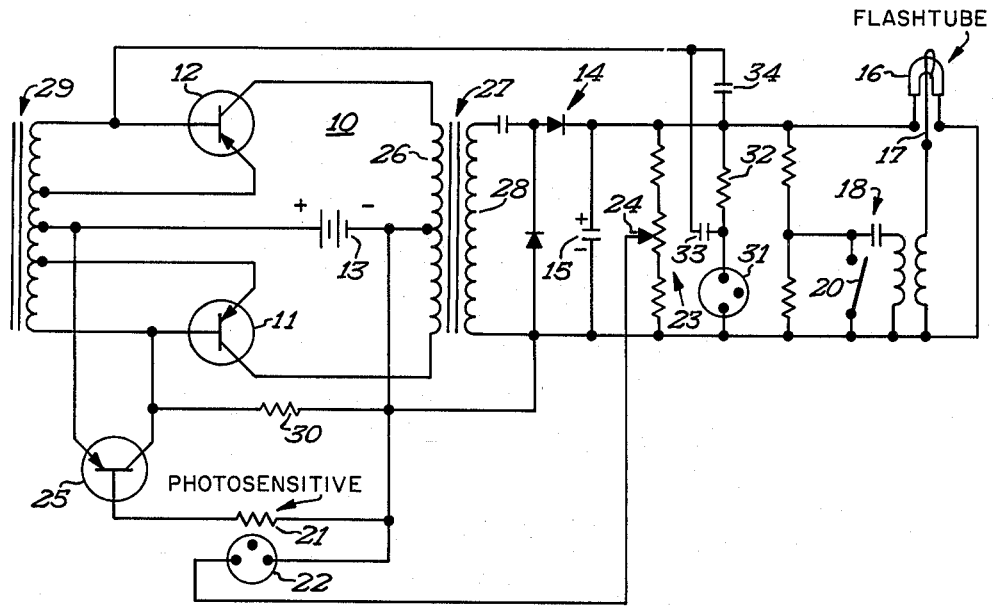

Jan. 11, 1966   J. L. JENSEN   3,229,158
ELECTRONIC PHOTOGRAPHIC FLASH APPARATUS WITH PHOTOSENSITIVE
CAPACITOR CHARGE MONITORING
Filed Feb. 21, 1962   2 Sheets-Sheet 1

INVENTOR.
JAMES LEE JENSEN
BY
Francis A. Sim
ATTORNEY

United States Patent Office 3,229,158
Patented Jan. 11, 1966

3,229,158
ELECTRONIC PHOTOGRAPHIC FLASH APPARATUS WITH PHOTOSENSITIVE CAPACITOR CHARGE MONITORING
James Lee Jensen, St. Louis Park, Minn., assignor to Honeywell Inc., a corporation of Delaware
Filed Feb. 21, 1962, Ser. No. 174,850
3 Claims. (Cl. 315—158)

The present invention is concerned with an electronic photographic flash apparatus and more particularly with the type of photographic flash apparatus utilizing electronic inverter means, converting a low voltage to a high voltage, which is effective to charge a flash capacitor that is connected to a high voltage electronic flash tube. In normal practice, the capacitor is charged to a voltage magnitude determined by the inverter means. Sometime thereafter, the photographer selectively energizes the flash tube, by means of a triggering circuit, to allow the capacitor to discharge through the flash tube to produce a brilliant flash of light to illuminate the subject to be photographed.

A further development of this art has provided monitor circuit arrangements effective to regulate the charging of the capacitor so as to minimize energy drain of the primary source of energy, normally low voltage flashlight size batteries. Specifically, this is accomplished by various means responsive to the energy level or voltage present at the capacitor to turn the inverter on and off, maintaining a voltage on the capacitor within close limits. Such monitor arrangements allow fast recycle since the inverter means may be constructed and arranged to supply a high voltage above the working voltage of the capacitor, and the monitoring circuit may be constructed and arranged to turn off the inverter means when the working voltage is reached. Thus, the capacitor is charged to the working voltage in a shorter time period. Furthermore, the rated light output of the electronic flash apparatus, as rated by the manufacturer, is held more nearly constant with the use of such a monitor circuit.

The present invention is directed to an improvement of the above mentioned monitor circuit arrangements, and specifically this improvement consists of the use of a photosensitive means having a high magnitude dark resistance and a low magnitude light resistance. This photosensitive resistor is connected to the inverter means in controlling relation thereto. The photosensitive means is operatively associated with voltage sensitive light generating means in the form of a neon bulb, the neon bulb being interconnected with the capacitor and sensitive to the state of charge of this capacitor. Thus, the neon bulb is effective, upon the condenser reaching a given voltage level related to its working voltage, to energize the photosensitive means by virtue of the light energy emitted by the neon bulb, to thus render the inverter means inoperative to further charge the capacitor.

As is well known, voltage sensitive light generating means, such as neon bulbs, are presently utilized as "ready lights." A ready light functions to visually indicate to the photographer that the flash capacitor has been charged to a given value. It is within the teachings of the present invention to utilize this "ready light" neon bulb as the neon bulb which is operatively associated with the photosensitive means, or a separate neon bulb may be used. Thus, the "ready light" performs the dual function of indicating to the photographer that the flash unit is ready for use and also energizing the photosensitive means to render the inverter means inoperative.

As the state of charge of the capacitor decreases, either by virtue of a discharge of the flash capacitor through the flash bulb, or by virtue of the inherent leakage current of the capacitor, the neon bulb is de-energized and the photosensitive means no longer receives light energy therefrom. The inverter is again operative to recharge the capacitor or to replace the leakage which has drained off the capacitor.

It is also within the teachings of this invention to provide auxiliary means in the form of timer means effective to periodically restart the inverter means, upon a time function, to replace leakage current. Further, the present invention provides means to restart the inverter means upon discharge of the capacitor through the photographic flash tube, as selectively controlled by the photographer.

Figure 2:
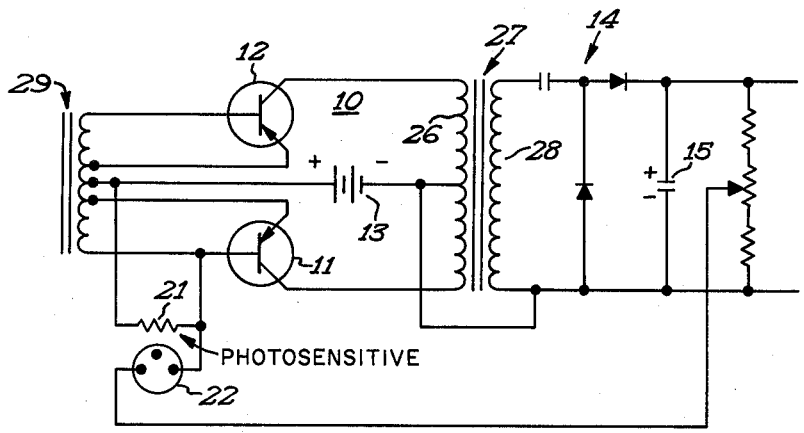
Figure 3:
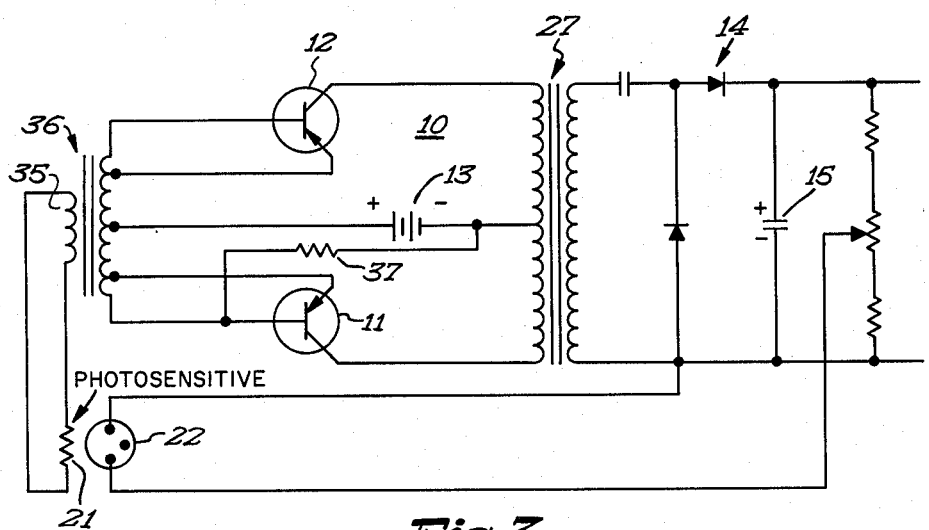
Figure 4:
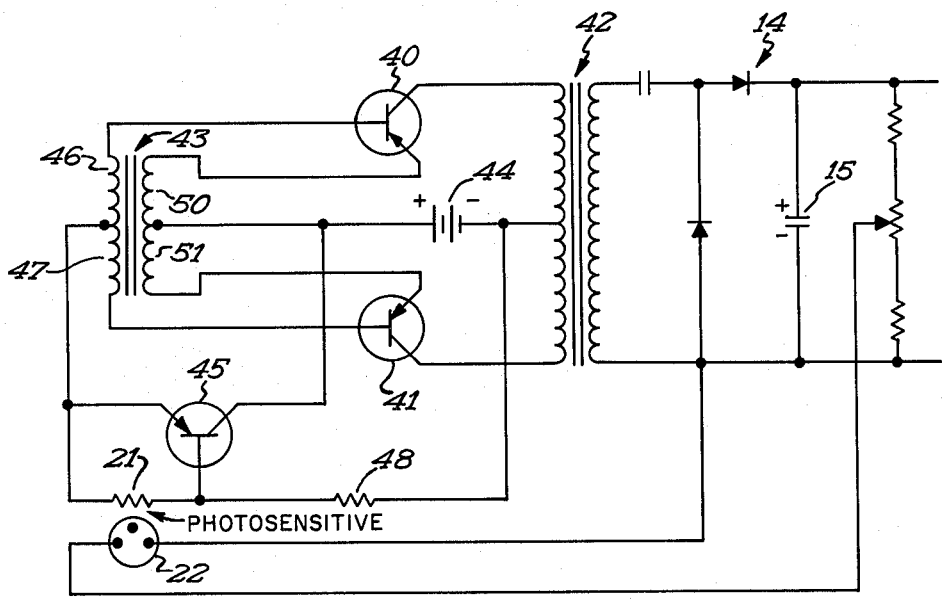

The present invention will be apparent to those skilled in the art upon reference to the following specification, claims, and drawings, of which:

FIGURE 1 is a schematic representation of my invention, showing a photosensitive resistor controlling a control transistor, the control transistor in turn being connected to control the inverter means, FIGURE 2 is a modification of the structure of FIGURE 1 wherein the control transistor has been eliminated, FIGURE 3 is an embodiment of my invention wherein the photosensitive resistor and the neon bulb are electrically isolated from the components of the inverter, and FIGURE 4 is a further embodiment of my invention.

Referring specifically to FIGURE 1, reference numeral 10 designates generally inverter means in the form of a full wave electronic oscillator having first and second transistors 11 and 12 interconnected with a low voltage battery 13. Battery 13 may in fact be a plurality of flashlight-like tubular batteries of the D or the C cell size.

Reference numeral 14 designates generally rectification means in the form of a voltage doubler circuit effective to charge a flash capacitor 15 connected to the electrodes of a flash tube 16. Flash tube 16 is provided with a starting electrode 17 connected to a triggering circuit designated generally by means of a reference numeral 18. Reference numeral 20 designates a switch, which may be the shutter switch of a camera, effective to energize flash tube 16 to allow the discharge of capacitor 15 through the flash tube to produce a brilliant flash of light.

Reference numeral 21 designates a photosensitive resistor which is closely associated with a neon bulb 22. Thus, photosensitive resistor 21 and neon bulb 22 are operatively associated so that the light energy emitted from neon bulb 22, upon energization thereof, impinges upon photosensitive resistor 21 to change its resistance. Specifically, photosensitive resistor 21 has a high magnitude dark resistance and a low magnitude light resistance.

Neon bulb 22 is connected to be responsive to the state of charge of, or to the voltage on, capacitor 15 by virtue of a voltage divider network designated generally by means of reference numeral 23. The voltage at which neon tube 22 fires, or becomes conductive, can be adjusted by means of the movable potentiometer wiper 24.

Photosensitive resistor 21 is connected in controlling relation to a control transistor 25, control transistor 25 being normally nonconductive and being rendered conductive to stop oscillation of the inverter 10 upon photosensitive resistor 21 being subjected to light energy from neon bulb 22.

Considering the inverter or oscillator 10 in greater detail, transistors 11 and 12 provide full wave oscillation wherein the base-to-emitter circuits of the transistors are connected in series with the opposite portions of primary winding 26 of transformer 27, whose secondary winding 28 constitutes the source of energizing voltage for the voltage doubler 14. Also connected in this series circuit is the low voltage source 13 and the upper and lower portions respectively of the tapped winding of autotransformer 29. The base-to-emitter circuits of transistors 11 and 12 are connected to feedback means in the form of portions of the winding of autotransformer 29. Thus, the base-to-collector current flowing through one of the transistors is effective to apply a forward bias between the emitter and base of that particular transistor to sustain oscillation. After the current has built up to a maximum level, the other transistor is rendered conductive and in this manner transistors 11 and 12 are alternately conductive on half cycles to produce full wave A.C. voltage at secondary winding 28.

Control transistor 25 is normally nonconductive and the emitter-to-collector circuit of this transistor is connected to shunt that portion of the winding of autotransformer 29 which is connected to and associated with transistor 11. Thus, with transistor 25 conductive, the feed back means associated with transistor 11 is rendered ineffective (is shunted) and the oscillations cease, to thus stop the charging of capacitor 15. As has been mentioned, photosensitive resistor 21 in a dark condition has a high resistance. This resistor lies in the emitter-to-base circuit of control transistor 25, as can be seen by tracing a circuit from the positive terminal of low voltage source 13 through the emitter-to-base circuit of transistor 25 and photosensitive resistor 21 to the negative terminal of battery 13. While the above traced circuit constitutes a forward biasing circuit for transistor 25, the high magnitude dark resistance of photosensitive resistor 21 is such as to prevent conduction of transistor 25.

As inverter 10 continues to oscillate, capacitor 15 is charged and the terminal voltage of this capacitor increases to the point where neon bulb 22 is energized. Energization of neon bulb 22 causes current to flow between the electrodes thereof and causes light energy to impinge upon photosensitive resistor 21 to thus change the value of the resistor to its light condition. The resistance of photosensitive resistor 21 thereby appreciably decreases and the above traced circuit providing forward bias for transistor 25 is effective to render the transistor conductive, or in other words to switch the transistor to an "on" state. In this condition, current flow can be traced from the positive terminal of battery 13 through the emitter-to-collector circuit of transistor 25 and through a resistor 30 to the negative terminal of battery 13. So long as transistor 25 remains conductive, the emitter-to-collector impedance of this transistor is very low and the feedback means, that is the lower portion of the winding of reactor 29, is shunted to render the feedback means inoperative. Thus, oscillation stops and the charging of capacitor 15 likewise is interrupted.

The apparatus of FIGURE 1 is now in a standby condition wherein capacitor 15 is charged to a predetermined voltage. The photographer may now selectively close switch 20 to discharge capacitor 15 through flash tube 16. However, during the standby period the charge on capacitor 15 gradually reduces due to the leakage current of this capacitor. As a result, neon bulb 22 may extinguish, whereupon transistor 25 is again rendered nonconductive and transistor 11 is rendered conductive by means of a biasing circuit which can be traced from the positive terminal of battery 13 through the emitter-to-base circuit of transistor 11 and resistor 30 to the negative terminal of battery 13. Oscillation of network 10 is thus initiated to restore the leakage current and recharge capacitor 15.

It may be desirable to provide restarting timing means in the form of a further neon tube 31 connected in series with a resistor 32 and in parallel with capacitor 15. This network is effective to apply a negative restarting pulse through capacitor 33 to the base electrode of transistor 12 to periodically restart network 10 on a time function.

Furthermore, the discharge of capacitor 15 through the flash tube 16, which causes neon tube 22 to be extinguished, may also be utilized in conjunction with a capacitor 34 to apply a negative restarting pulse of voltage to the base electrode of transistor 12.

Referring now to FIGURE 2, this figure discloses an arrangement whereby the photosensitive resistor 21 is connected directly to the lower portion of the winding of reactor 29 rather than through the control transistor 25 of FIGURE 1. Furthermore, in this configuration the current flowing through neon tube 22, when this tube is energized, supplies a back biasing current to hold transistor 11 nonconductive. To simplify the showing of FIGURE 2, portions of FIGURE 1 have been eliminated and like reference numerals have been utilized to designate the equivalent construction, designating similar elements found in the two figures.

From a consideration of FIGURE 2, it can be seen that illumination of photosensitive resistor 21, as a result of energization of neon tube 22, is effective to appreciably lower the resistance value of the photosensitive resistor and thus shunt the lower portion of the winding of reactor 29, to stop oscillation of the network 10. Furthermore the current flow circuit for neon tube 22 can be traced through the tube and through the base-to-emitter circuit of transistor 11, a portion of the winding of reactor 29 and battery 13 to the main flash capacitor 15.

Referring to FIGURE 3, this figure discloses a modification wherein the network 10, including transistors 11 and 12, is isolated from the voltage doubler network 14. Neon tube 22 is again connected to capacitor 15 and is sensitive to the voltage thereon. However, neon bulb 22 is not connected to any portion of the network 10, as found in FIGURES 1 and 2. Furthermore, the photosensitive resistor 21 is connected to the secondary winding 35 of a transformer 36, which transformer replaces the autotransformer 29 of FIGURES 1 and 2. In the configuration of FIGURE 3, the network 10 functions identical to that above described in connection with FIGURE 1. The feedback means comprising transformer 36 is controlled by photosensitive resistor 21 connected to the secondary winding of the transformer. Thus so long as photosensitive resistor 21 is in a dark condition to provide a high magnitude resistance, the feedback within network 10 functions to cause the network to oscillate to charge capacitor 15. However, upon neon tube 22 becoming energized as a result of capacitor 22 receiving a given magnitude of charge, photosensitive resistor 21 is illuminated by the light energy emitted from the neon tube and as a result, the secondary winding 35 of transformer 36 is loaded by a low resistance impedance. As a result, feedback no longer exists and network 10 stops oscillating.

Here again, neon tube 22 becomes de-energized upon the charge on capacitor 15 being reduced, either due to leaking current of this capacitor or due to discharge of the capacitor through the photographic flash tube 16. A biasing means in the form of a restarting resistor 37 is provided such that restarting biasing current can be traced from the positive terminal of battery 13 through the emitter-to-base circuit of transistor 12 and through resistor 37 to the negative terminal of battery 13.

Referring now to FIGURE 4, transistors 40 and 41 are interconnected with a first transformer 42, a second transformer 43 and a low voltage battery 44 to form an oscillator network in which a normally conductive control transistor 45 is connected in the base return circuit of the transistors 40 and 41. Photosensitive resistor 21, again operatively associated with neon bulb 22, is connected to control transistor 45 and to render this transistor non-conductive and thereby interrupt the base return circuit of the oscillating transistors 40 and 41, to thus interrupt oscillation. Specifically, the forward biasing circuit for transistors 40 and 41 can be traced from the positive terminal of battery 44 through the emitter-to-base circuits of the transistors 40 and 41, and then through the opposite portions of the windings 46 and 47 of transformer 43, through the emitter-to-base circuit of transistor 45 and thorugh a resistor 48 to the negative terminal of battery 44. The coupling between windings 46 and 47 and windings 50 and 51 of transformer 43, constitute the feedback means to cause transistors 40 and 41 to be alternately conductive and then nonconductive and thus oscillate. Capacitor 15 is again charged by virtue of the voltage doubler network 14, and neon tube 22 is again connected to capacitor 15 to be responsive to the state of charge of this capacitor. Upon capacitor 15 receiving a given charge, neon tube 22 is energized to illuminate photosensitive resistor 21. The illumination of this photosensitive resistor causes its resistance to appreciably reduce, and as a result the emitter-to-base circuit of transistor 45 is shunted by a low impedance to thus render this transistor nonconductive. With transistor 45 nonconductive, the emitter-to-base circuit of the transistors 40 and 41, as above traced, is interrupted and thus oscillation ceases.

Here again, as capacitor 15 becomes discharged, either due to leakage current or due to a sudden discharge of the capacitor through the flash tube, neon tube 22 is de-energized and photosensitve resistor 21 again assumes a high magnitude resistance condition, wherein the base return circuit for transistors 40 and 41, above traced, is again effective to render the transistor 45 conductive and transistors 40 and 41 alternately conductive and then nonconductive to recharge capacitor 15.

From the above description it can be seen that I have provided an improved control or monitor circuit for electronic photographic flash apparatus wherein a photosensitive resistor is utilized with a neon tube, the neon tube being connected to be responsive to the state of charge of the main flash capacitor, and the photosensitive resistor being connected in controlling relation to the electronic inverter, to thus regulate the electrical charging of the main flash capacitor. As has been stated, the neon tube 22 may be situated within the housing of the electronic photographic flash apparatus such that the neon tube 22 may also constitute the ready light to be viewed by the photographer, the illumination of this ready light indicating to the photographer that the flash capacitor has been charged to the required value.

Modifications of the present invention will be apparent to those skilled in the art, and it is therefore intended that the scope of the present invention be limited solely by the scope of the appended claims.

I claim as my invention:
1. Electronic photographic flash apparatus comprising;
a low voltage source,
a first and a second transformer, each having primary and secondary windings,
a transistor having output means including the primary windings of said first and second transformers and said low voltage source, and having input feedback means including the primary winding of said first transformer, to thereby form an electronic oscillator circuit,
capacitor means,
a flash tube connected to said capacitor means,
rectifier means interconnecting said capacitor means and the secondary winding of said second transformer,
voltage responsive light generating means,
means connecting said light generating means to said capacitor means to energize the same upon said capacitor means receiving a given charge,
a photosensitive resistor having a high dark resistance and a low light resistance, said phtotosensitive resistor being positioned to receive light from said light generating means,
and means connecting said photosensitive resistor to the secondary winding of said first transformer to thereby control said oscillator circuit.

2. Electronic photographic flash apparatus comprising;
a low voltage D.C. source,
a first and a second transformer, each having separate primary and secondary windings,
a transistor having output means including the primary windings of said first and second transformers and said low voltage source, and having input feedback means including the primary winding of said first transformer, to thus form an oscillator circuit,
biasing means including said low voltage source to render said transistor normally conductive and said oscillator circuit normally oscillating,
capacitor means,
a flash tube connected to said capacitor means,
rectifier means interconnecting said capacitor means and the secondary winding of said second transformer to thus charge said capacitor means as said oscillator circuit oscillates,
a neon tube,
means connecting said neon tube to said capacitor to energize the same upon said capacitor receiving a given charge,
a photosensitive resistor operatively associated with said neon tube and sensitive to light therefrom,
and means connecting said photosensitive resistor to the primary winding of said first transformer to stop oscillation of said oscillator circuit upon said neon bulb being energized.

3. Photographic flash apparatus, comprising;
a transformer having a primary and a secondary winding,
a low voltage D.C. source,
an autotransformer having a winding with end terminals and a tap,
a transistor having base, emitter, and collector electrodes,
means connecting in series circuit said transformer primary, said low voltage source, said autotransformer end terminals, and said base and collector electrodes,
means connecting said emitter electrode to said autotransformer tap, to form an oscillator circuit,
a capacitor to be charged to a given voltage,
rectification means connecting said capacitor to the secondary winding of said transformer,
a photosensitive resistor shunting a portion of said autotransformer,
a neon tube operatively associated with said photosensitive resistor to illuminate the same when said neon tube is energized,
and circuit means connecting said neon tube through the base to emitter circuit of said transistor to said capacitor.

References Cited by the Examiner

UNITED STATES PATENTS

| | | | |
|---|---|---|---|
| 2,779,897 | 1/1957 | Ellis | 315—156 X |
| 2,808,559 | 10/1957 | Engle | 315—158 X |
| 2,935,650 | 5/1960 | Rock | 315—241 |
| 2,946,924 | 7/1960 | Gerlach | 315—241 |
| 2,957,152 | 10/1960 | Van Gool et al. | 252—501 |
| 2,977,524 | 3/1961 | Lingle | 315—241 |
| 3,007,081 | 10/1961 | Sebastian | 315—241 |
| 3,134,066 | 5/1964 | Townsend | 320—1 |

FOREIGN PATENTS 863,298  3/1961  Great Britain.

JOHN W. HUCKERT, *Primary Examiner.*
JAMES D. KALLAM, *Examiner.*